United States Patent [19]
Hanley et al.

[11] Patent Number: 5,207,737
[45] Date of Patent: May 4, 1993

[54] ANALOG OUTPUT ELECTRO-PNEUMATIC TRANSDUCER

[75] Inventors: Mark G. Hanley, Gurnee; Guy P. Caliendo, Algonquin, both of Ill.

[73] Assignee: Landis & Gyr Powers, Inc., Buffalo Grove, Ill.

[21] Appl. No.: 842,890

[22] Filed: Feb. 27, 1992

[51] Int. Cl.$^5$ ............................................. G05D 16/20
[52] U.S. Cl. ...................................... 137/85; 137/102
[58] Field of Search ............... 137/82, 85, 86, 487.5, 137/102

[56] References Cited

U.S. PATENT DOCUMENTS

| | | | |
|---|---|---|---|
| 4,481,967 | 11/1984 | Frick | 137/85 |
| 4,492,246 | 1/1985 | Prescott et al. | 137/85 |
| 4,527,583 | 7/1985 | Simpson | 137/82 |
| 4,534,376 | 8/1985 | Brown | 147/84 X |
| 4,617,952 | 10/1986 | Fujiwara et al. | 137/85 |
| 4,695,034 | 9/1987 | Shimizu et al. | 251/129.06 |
| 4,705,067 | 11/1987 | Coffee | 137/487.5 |
| 4,722,360 | 2/1988 | Odajima et al. | 137/487.5 |
| 4,777,383 | 10/1988 | Waller et al. | 137/487.5 X |
| 4,855,659 | 8/1989 | Riensche | 318/645 |
| 4,898,200 | 2/1990 | Odajima et al. | 137/85 |
| 4,901,758 | 2/1990 | Cook et al. | 137/487.5 |

*Primary Examiner*—Alan Cohan
*Attorney, Agent, or Firm*—Welsh & Katz, Ltd.

[57] ABSTRACT

An electro-pneumatic pressure transducer is provided with a valve body assembly having a supply chamber, an exhaust chamber and an intake assembly to provide a source of fluid to the transducer. The transducer also has an output assembly directing the fluid to a pneumatic actuator. The valve body further includes a supply valve assembly and an exhaust valve assembly having bender elements adjustably mounted to the valve body with respect to nozzles. A manifold structure is included for fluidly connecting the supply valve, the exhaust valve and the output assemblies. A pressure sensor is used to measure the pressure in the valve body and is responsive to increases or decreases of the pneumatic pressure in the valve body. A monitor is used to monitor the power source and to generate a failure mode signal when the power source fails to supply a predetermined level of power. A control, responsive signal generated by the sensor and the monitor, is included to move the bender elements to achieve a specified fluid pressure in the transducer. An independent fail-safe condition is also provided in the transducer to depressurize the transducer when power is absent for a predetermined period of time.

22 Claims, 5 Drawing Sheets

ANALOG OUTPUT ELECTRO-PNEUMATIC TRANSDUCER

The present invention relates generally to a electro-pneumatic pressure converter having a continuous control and feedback system and a fail-safe feature to allow remote electronic control of pneumatically actuated devices.

BACKGROUND OF THE INVENTION

In conventional electro-pneumatic pressure converters, electrical input signals are used to regulate valves to attain and maintain a desired pressure value for the pneumatic actuator being operated. It is often desirable from a cost perspective and for design purposes, to control a pneumatic system from a remote location and through electrical signals. Often, in the past, piping would be extended from a control room or pressure regulator at one location to the pneumatic device at another location. Electro-pneumatic systems allow the implementation of electrical control systems by converting electrical signals to a pressure value at the location of the pneumatic mechanism being operated.

Electro-pneumatic transducers are typically utilized with devices such as damper actuators, control valves, positioners, step controllers and switching devices. Typically, the electro-pneumatic pressure converter can be used as an interface device to provide a means to control activation of simple pneumatically actuated machinery or for implementing complex HVAC control strategies, directing fluid control systems, and controlling robotic systems and the like with pneumatic devices. Generally, these pneumatic devices require the use of costly transducers which consume large amounts of energy and require significant maintenance.

Typically, electro-pneumatic transducers have been based on two conventional configurations. One configuration utilizes a modulating two-way valve with its input connected to a pressure source through a fixed small opening or restriction and an exhaust output connected to the atmosphere surrounding the device. Varying the effective restriction through the valve results in a variation of the pressure drop across the valve, which typically serves as a device output signal. The disadvantages of such a configuration include an inherent trade-off between output capacity and air consumption, a significant increase in device air consumption as output approaches atmosphere pressure and the inability to effectively control devices having output near to and including atmospheric pressure due to the finite restriction through a full open valve system. A pneumatic relay or amplifier stage is often included in these configurations in order to minimize the effect of these and other difficulties. However, the additional features do not sufficiently diminish the problem, and often actually substantially increases the complexity, size and overall cost of the device.

Yet another known configuration replaces the fixed restriction with an additional modulating two-way valve. These two-way valves are generally referred to as the supply and exhaust valves. In these configurations, changes in output pressure are achieved by simultaneously varying the effective restriction through both valves. Thus, increases in output pressure are generated by simultaneously decreasing the effective restriction through the supply valve on the input pressure source while increasing the restriction through the exhaust valve to atmosphere. Conversely, decreases in output pressure are achieved by increasing the effective restriction through the supply valve simultaneously while decreasing the effective restriction through the exhaust valve.

Modulation of the effective restriction through such electro-mechanical valves may be accomplished with either a linear or switch mode control circuit. With linear control circuits, an analog signal is used to continuously vary the valve restriction. Accordingly, in systems utilizing a linear control, there is virtually constant actuation and deactuation of the valves to achieve and maintain a predetermined pressure value. These systems typically utilize a significant amount of energy and are prone to significant wear and maintenance. With switch mode control circuitry, the valve is driven into one of two extreme states, either fully opened or closed, for varying intervals of time to achieve and maintain a desired pressure value. The effective or average restriction is modulated by varying the switching signal duty cycle. These systems are generally not capable of producing quick pressure changes or adjusting rapidly for changes in pressure due to outside influences, such as full or temporary power failure or unintentional sudden pressure changes forced on the regulator. Accordingly, switch mode control circuitry requires a significant amount of continual electrical power and constant valve manipulation to achieve and maintain a desired pressure value.

One particular cost problem which relates to the problem of system control is the response speed to a signal or desired pressure change. Generally, it is necessary to have a fast response time so that a desired pressure change will achieve its desired results. However, in systems with both vent exhaust and supply valves, such a fast response time means a large "dead band" between the operation of the valves to prevent uncontrolled oscillation or vibration of the two valves. Typically, the fast response time prevents fine control of the system and the pneumatic machinery being driven. Furthermore, such electro-pneumatic transducers do not typically incorporate an intrinsic fail-safe feature which allows the actuator to bleed off quickly without unwanted repressurization, with minimal or no power consumption. Typically, additional hardware must be purchased to provide for a fail-safe option, or other manual control options may be used.

Piezoelectric actuated valves have been generally recognized as high speed, low power and low cost alternatives to electro-magnetic devices. However, the known currently available piezoelectric valve systems typically utilize control systems and valve designs that have three serious drawbacks in common. First, device air consumption is significant because of the constant pressure control and maintenance required to hold a specified predetermined pressure value for the system. Typically, many of these devices are not designed with attention to minimizing air loss and device failure due to small orifices that are prone to obstruction and unintentional leakage. Further, known currently available piezoelectric actuated valves provide a low output capacity and generally require the additional complexity and cost of an intervening pneumatic amplifier or relay stage system and extrinsic fail-safe hardware.

Thus, there is a need for an electro-pneumatic transducer that incorporates an intrinsic fail-safe feature and which is simple and less costly to manufacture, relatively low in power consumption and requires low maintenance. Additionally, there is a need for a transducer with these features and advantages, but that is also relatively easy to retrofit to existing pneumatic systems to provide efficient and continuous electrical-pneumatic control.

Accordingly, it is an object of the present invention to provide a low-cost, improved performance electro-pneumatic transducer in a compact configuration.

It is a further object of the present invention to provide an electro-pneumatic pressure transducer, which utilizes two high output capacity piezoelectric actuated valves, an electronic pressure transducer and a linear closed loop electronic valve control circuit, to provide a system having a high switching speed, low electrical power consumption and low component and maintenance costs.

It is yet a further object of the present invention to provide an electro-pneumatic transducer which utilizes highly efficient piezoelectric actuated valves in a sealed system having a linear closed loop control circuit for continuous feedback/control of the pneumatic pressure valve, and having an electronic fail-safe feature and an intrinsic fail-safe feature that responds to temporary or full power failure by depressurizing the system.

Other features and advantages of the present analog output electro-pneumatic transducer will become apparent to those skilled in the art upon review of the following detailed description, claims and drawings, in which:

DETAILED DESCRIPTION OF THE INVENTION

In accordance with the present invention, all of the foregoing objects, as well as others that may become apparent are achieved generally by the present analog output electro-pneumatic transducer. Broadly stated, an electro-pneumatic pressure transducer is provided with a valve body assembly having a supply chamber, an exhaust chamber and an intake assembly to provide a source of fluid to the transducer. The transducer also has an output assembly directing the fluid to a pneumatic actuator. The valve body further includes a supply valve assembly and an exhaust valve assembly having bender elements adjustably mounted to the valve body with respect to nozzles. A manifold structure is included for fluidly connecting the supply valve, the exhaust valve and the output assemblies.

A pressure sensor is used to measure the pressure in the valve body and is responsive to increases or decreases of the pneumatic pressure in the valve body. A monitor is used to monitor the power source and to generate a failure mode signal when the power source fails to supply a predetermined level of power. A control, responsive signal generated by the sensor and the monitor, is included to move the bender elements to achieve a specified fluid pressure in the transducer. An independent fail-safe condition is also provided in the transducer to depressurize the transducer when power is absent for a predetermined period of time.

More specifically, referring now to the drawings, and particularly to FIGS. 1–4, the current electro-pneumatic transducer is referred to generally as 10. The transducer 10 has a main valve body 20 having an inner surface 22, an outer surface 24 and a perimeter 26. It should be understood that the main valve body 20 can be constructed or molded from any sufficiently hardened substance, such as metal or polymetric materials that are not porous and able to withstand high temperatures. Generally, the valve body 20 includes a supply valve and an exhaust valve enclosed with separate chambers, and are configured to attain and sustain a desired fluid pressure in the transducer 10 by selectively permitting and restricting the flow of fluid through the valve body 20.

With this in mind, the valve body 20 includes two integrally formed post formations for the input and output of the pneumatic fluid through the valve body 20. Preferably, the valve body 20 will have at least one supply port 28 and at least one output port 30 integrally formed along the perimeter 26 of the valve body 20. The supply port 28 is configured to accept a pneumatic fluid from the desired supply source. The output port 30 is configured and arranged to be releasably connected to the regulated pneumatic actuator.

Both the supply port 28 and the output port 30 may be configured as integrally depending posts, or it may be desirable to configure the ports 28 and 30 differently to match a specified supply source and pneumatic actuator. The outer surface 24 also has formed within the recess portion 42 an output recess 43 which acts as a passageway for the pressurized fluid to travel to the output port 30 and the desired pneumatic actuator utilized. It should be understood that other input and output formations may be adapted to the valve body 20 without departing from the overall principles as disclosed herein.

Figure 4:
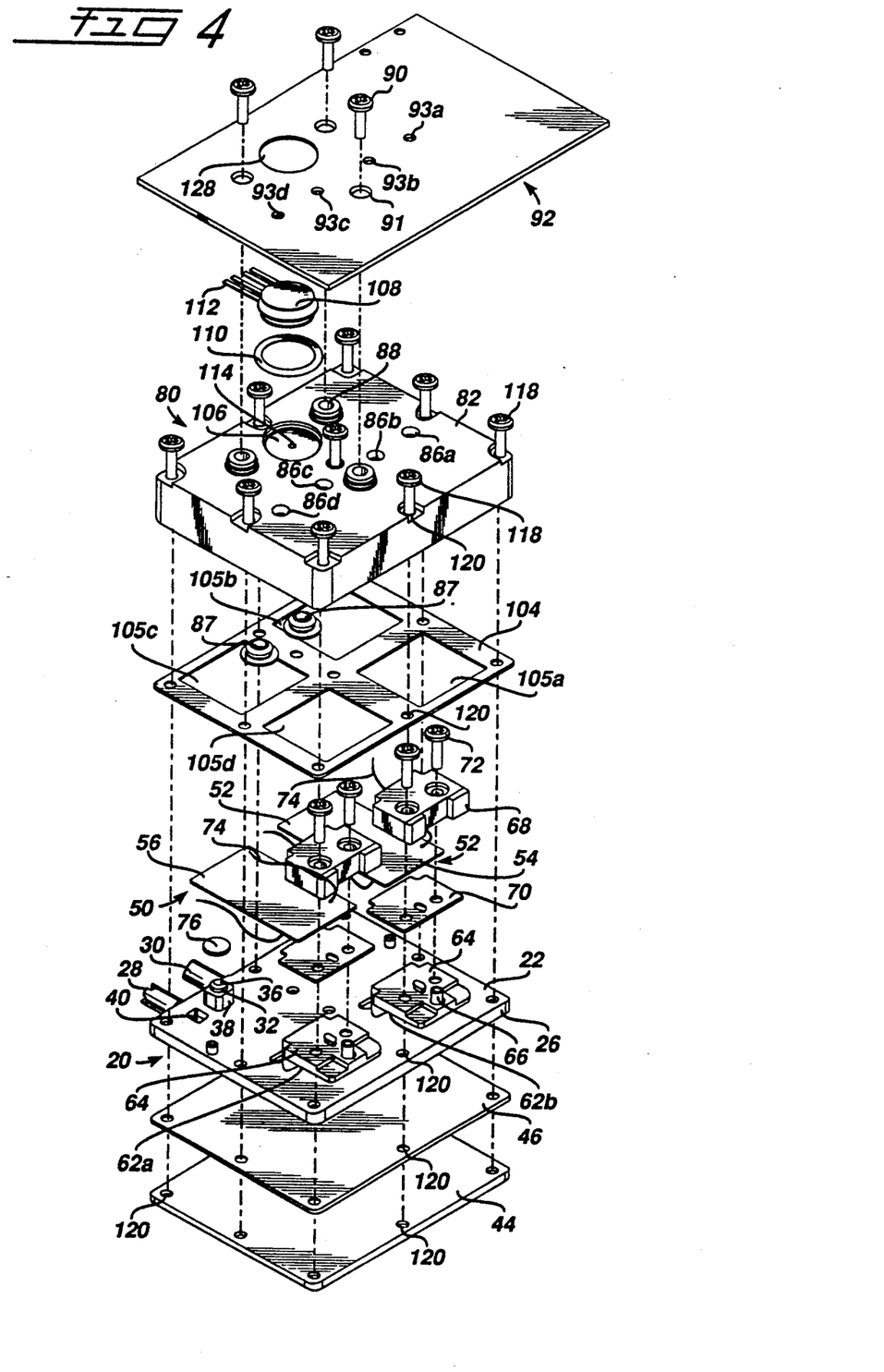
FIG. 4 depicts an assembly view of the electro-pneumatic transducer in accordance with the invention.
Figure 7:
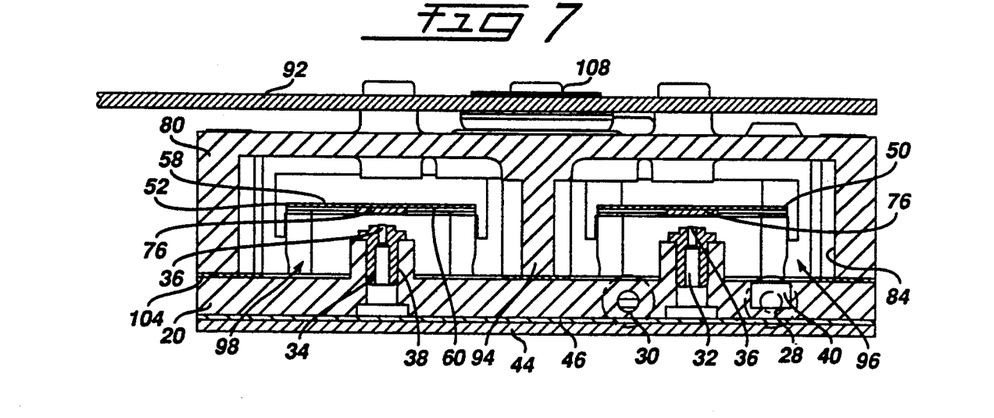
FIG. 7 is a cross-sectional view of the inventive electro-pneumatic transducer taken along line 7—7 as shown in FIG. 1.

Valve body 20 also has located on its inner surface 22 at least one supply nozzle 32 and at least one exhaust nozzle 34. As shown, both the supply nozzle 32 and the exhaust nozzle 34 are configured with a first end having a tiered configuration terminating in a mouth portion having an aperture 36. The supply nozzle 32 and the exhaust nozzle 34 can be integrally formed with the inner surface 22. Also, as shown in FIGS. 4 and 7, the nozzles 32 and 34 can each be separate components that are mounted into mounting structures 38. The mounting structures 38 are integrally formed on the inner surface 22 and configured to releasably accept the supply nozzle 32 and the exhaust nozzle 34. Regardless of how they are adapted to the valve body 20, the supply nozzle 32 and the exhaust nozzle 34 are in fluid communication with the outer surface 24 of valve body 20. The valve body 20 also has formed through its inner surface 22 a supply inlet 40 (best seen in FIG. 2) which provides the initial passageway for the fluid from the supply port 28 into the valve body 20.

Figure 1:
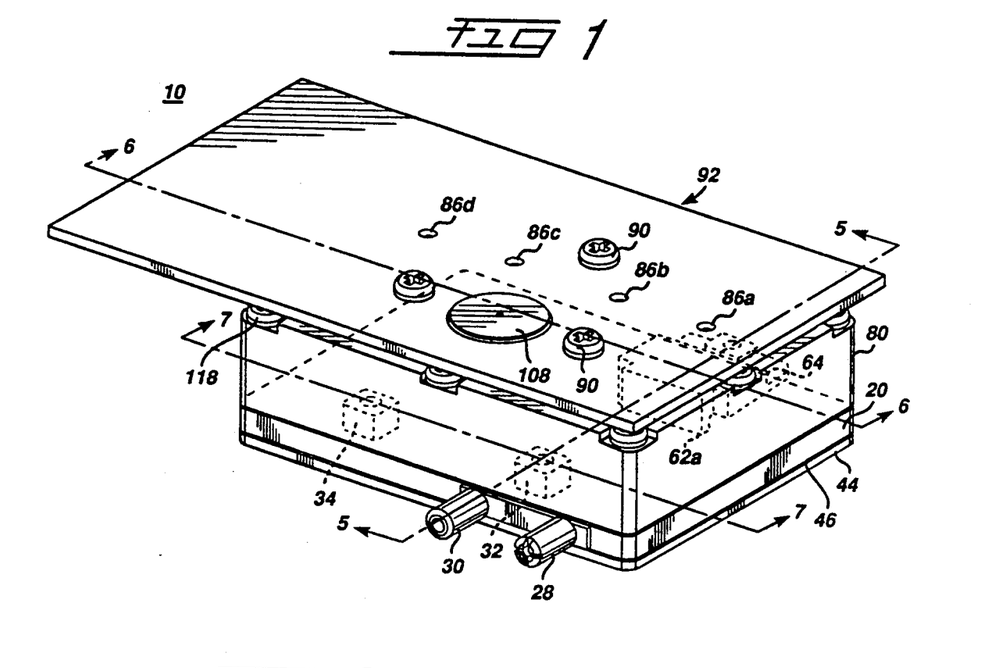
FIG. 1 is a perspective view generally depicting the electro-pneumatic transducer in accordance with the invention.
Figure 2:
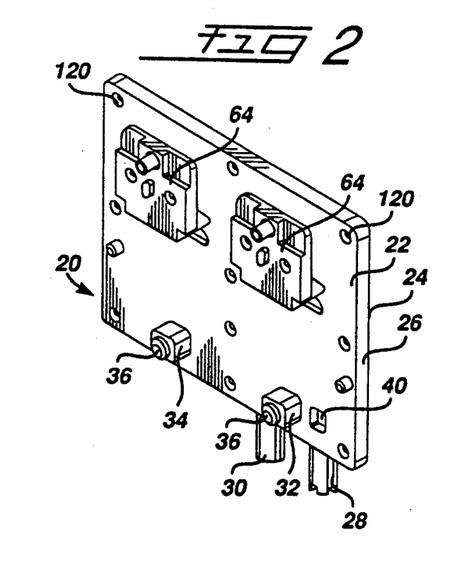
FIG. 2 depicts a perspective front view of the valve body in accordance with the invention.
Figure 3:
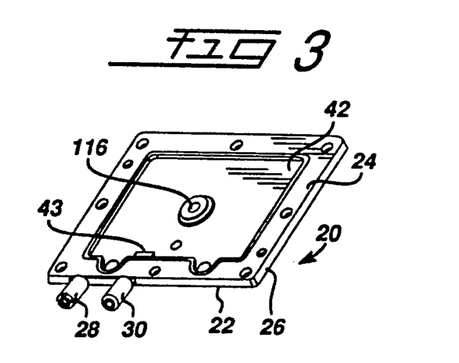
FIG. 3 depicts a perspective rear view of the valve body of FIG. 2.

As shown in FIG. 3, the valve body 20 has formed on its outer surface 24 a recessed portion 42, which is dimensioned substantially to the perimeter 26 of the valve body 20. The output recess 43 is in fluid communication with output port 30. A backing plate 44 and a gasket 46 are releasably attached to the outer surface 24 to form a damping volume 48 with the valve body 20, which also manifolds the supply nozzle 32 with the exhaust nozzle 34 and the output port 30 when pressurized fluid is introduced to the transducer 10. The damping volume or manifold 48 (best seen in FIGS. 5 and 6) serves to guarantee a stable operation of the pneumatic actuator by absorbing pressure fluctuations introduced to the system from outside sources and during initial pressurization.

The transducer 10 also includes piezo-ceramic benders or actuators that are preferably configured as a bendable element, plate, flap or tongue which has one end positioned substantially adjacent the nozzle apertures 36 for selectively controlling the amount of fluid that is allowed to flow through the supply nozzle 32 and exhaust nozzle 34. More particularly, the transducer 10 includes a supply valve bender 50, which is positioned and secured to the valve body 20 so as to permit and restrict the amount of flow of the fluid through said supply nozzle 32 from the supply port 28 and into the manifold 48. Similarly, an exhaust valve bender 52 is adjustably mounted to said valve body 20 so as to permit or restrict the flow of the fluid from the manifold 48 through the exhaust nozzle 34 for ventilating the transducer 10 under certain conditions.

Figure 5:
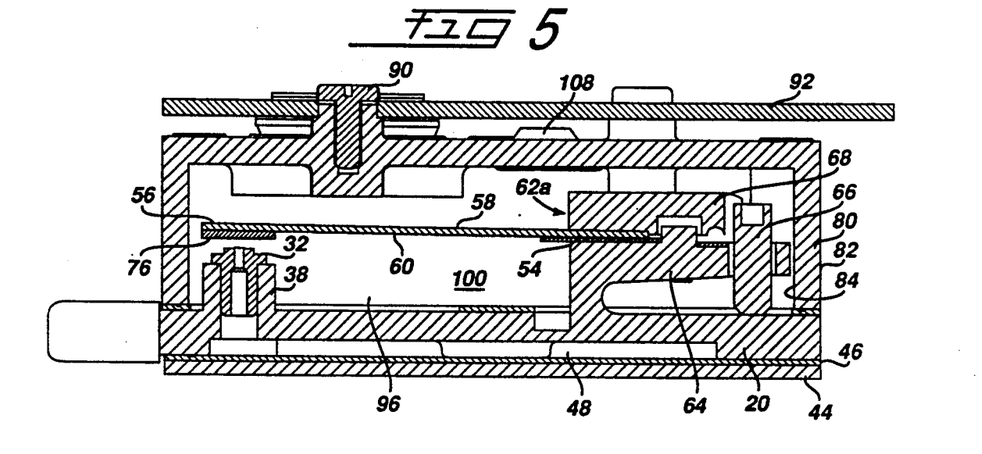
FIG. 5 is a cross-sectional view of the inventive electro-pneumatic transducer taken along line 5—5 as shown in FIG. 1.

Referring more particularly to FIGS. 4 and 5, it is shown that the supply valve bender 50 and the exhaust valve bender 52 each have a first end 54, a second end 56, a first surface 58, and a second surface 60. The benders 50 and 52 are each adjustably mounted along the first end 54 to cantilever fasteners 62a and 62b. The cantilever fasteners 62a and 62b are configured and arranged so that the benders 50 and 52 can be precisely mounted within the valve body 20 to specific tolerances with respect to the nozzles 32 and 34. The ability to precisely mount the benders 50 and 52 within specified tolerances of the nozzles 32 and 34 contributes to the operation of an intrinsic fail-safe mode.

Preferably the supply valve bender 50 will be fastened to cantilever 62a such that it is substantially adjacent to the aperture 36 of the supply nozzle 32. Preferably, the exhaust valve bender 52 will be fastened to cantilever 62b within 0.003" from the apeture 36 of the exhaust nozzle 34. Shown most clearly in FIG. 4, the cantilever fasteners 62a and 62b each include a mounting surface 64, cantilever mount adjustment screws 66 and electrically insulating, self-locating retaining clamps 68. The mounting surfaces 64 are preferably integrally formed to the inner surface 22 and are configured to secure the first end 54 of the benders 50 and 52 between the mounts 64 and clamps 68. The cantilever mount adjustment screws 66 are configured so that they can be rotated clockwise to reduce the gap between the second end 56 of the benders 50 and 52 and their respective nozzles 32 and 34 to achieve a specific or desired tolerance. Accordingly, as the cantilver screws 66 are rotated clockwise, a portion of the mounts 64 is forced away from the valve boby 20 thereby changing the mount angle and decreasing the gap between the second end 56 of the benders 50 and 52 and their respective nozzles 32 and 34. Also, an electrical insulator panel 70 may be included between the benders 50 and 52 and the cantilever mounts to complete the electrical insulation of the benders 50 and 52 from the valve body 20. It is preferred that the electrical insulator be configured from Mylar TM or similar insulative and thin materials. The retaining clamps 68 are fastened to the cantilever mounts 64 with fasteners 72 that do not contact the benders 50 and 52.

The benders 50 and 52 are preferred to be a low cost electrorestrictive element made of piezoelectric ceramic material, but it should be understood that other materials having electrorestrictive properties can effectively function without departing from the principles disclosed herein. Regardless of the material used for benders 50 and 52, electrical leads 74 are operationally connected, such as by soldering, to the benders 50 and 52 along their first end 54. The electrical leads 74 are operationally connected at their other end to a control circuit 200, which monitors and modulates the fluid pressure in the transducer 10 by selectively activating and deactivating the benders 50 and 52 with respect to nozzles 32 and 34.

A piezoelectric bending element utilizes the natural occurring mechanical deformation of the piezoelectric element when supplied or subjected to an applied electrical voltage. In other words, the benders 50 and 52, being of an electrorestrictive substance, such as piezoelectric ceramic, can be directed to bend towards or away from the nozzles 32 and 34 in response to a controlled amount of voltage directed from the control circuit 200 and applied through the electrical leads 74. Such piezoelectric benders are available from several manufacturers and can be selected for various sensitivities to electrical excitation to achieve a desired activated bend. The preferred benders are manufactured from a piezoelectric ceramic compound having a rectangularly shaped configuration with approximate dimensions of 1.5" L ×0.75"W×0.020" H. Other configurations and dimensions for benders 50 and 52 can be substituted depending on the particular formation of the nozzle or to achieve results not herein specified. The preferred benders are commercially available from Piezoelectric Products, Inc., Metuchen, N.J.

Each bender 50 and 52 has adhesively secured to its second surface 60 along the second end 56 at least one sealing disc 76 (best seen in FIGS. 4 and 5). The discs 76 are dimensioned to span at least the radius of apertures 36 of the nozzles 32 and 34. Preferably, the discs 76 are manufactured from a neoprene or other rubber-like material which has elastomeric properties. The disks 76 are configured to seal the apertures 36 of the nozzles 32 and 34 when the benders 50 and 52 are stroked down to stop or restrict the flow of fluid therethrough. A neoprene material is preferred, because other rubber-like materials may not have the tight tolerance and thickness properties required. Further, the material must be rated for high durability, heat tolerance and oil resistance, which is important in many applications of pneumatic actuators. A firm acrylic adhesive transfer tape (not shown) is used to adhere the discs 76 to the benders 50 and 52. The preferred adhesive tape is A-25 Pressure Sensitive Adhesive tape manufactured by the 3M Corporation. It should be understood that other adhesive tapes having the properties of being adherable to metallic materials, having high sheer and pull strength and being able to withstand high temperatures can be utilized.

As shown in FIGS. 5 and 7, because the first end 54 of the benders 50 and 52 are constrained in a fixed position within the valve body 20 with cantilever fasteners 62a and 62b, the second end 56 is allowed to move or to control the distance between the benders 50 and 52 and the respective nozzles 32 and 3 to selectively permit and restrict the amount of fluid flow. An electrical charge supplied to the benders 50 and 52 through said electric leads 74 from the control circuit 200 will cause the benders to bend or otherwise stroke downwards towards the nozzles 32 and 34 to close the apertures 36 of the nozzles 32 and 34. The absence of an electric charge to the benders 50 and 52 will eventually cause the benders 50 and 52 to return to a relaxed or straightened position. It should be understood that typical electrorestrictive benders, such as piezoelectric benders as preferred here, have an inherent capacitive quality once initially charged. In other words, the benders 50 and 52 will remain stroked downwards for a determinable amount of time following the application of an electrical charge. This naturally occurring static condition is used in conjunction with the preferred tolerances set between the benders 50 and 52 and the nozzles 32 and 34 to create an independent fail-safe mode that causes depressurization of the transducer 10 when there is a power failure or power shut-down after a predetermined period of time.

Referring now to FIG. 4 and 5, an outer cover 80 is configured having a front surface 82 and an inner cavity 84. The inner cavity 84 is dimensioned to releasably accept and retain the valve body 20. Outer cover 80 also includes threaded standoffs 88 configured to releasably accept fasteners 90. The fasteners 90, bores 91 and thread standoffs 88 are used to releasably secure a circuit substrate 92 to the outer cover 80 and thereby to the valve body 20. The substrate 92 is configured with electrical circuitry which defines the control circuit 200. Accordingly, the electrical leads 74 are directed through the outer cover 80 and operationally connected to the substrate 92 to provide electrical communication to the benders 50 and 52. To this end, outer cover 80 has apertures 86a, 86b, 86c and 86d and substrate 92 has apertures 93a, 93b, 93c and 93d that provide a passageway for leads 74 from the benders 50 and 52 through the outer cover 80 to the substrate 92.

Figure 6:
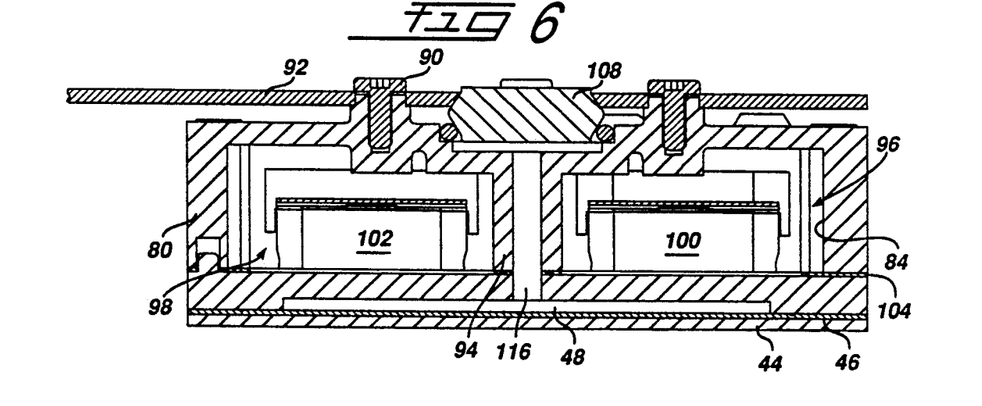
FIG. 6 is a cross-sectional view of the inventive electro-pneumatic transducer in accordance with the invention taken along line 6—6 as shown in FIG. 1.

Referring now to FIGS. 6 and 7, the inner cavity 84 includes an integrally formed dividing wall 94. The dividing wall 94 is configured and arranged relative to the inner surface 22 such that when the valve body 20 is releasably fastened to the inner cavity 84 of the outer cover 80 two distinctly separate inner chambers are formed therein between. A first chamber, or supply chamber 96 is airtight and separated from a second, or exhaust chamber 98 by wall 94. The supply chamber 96 encases the supply nozzle 32, the supply valve bender 50, and the cantilever fastener 62a to form a supply valve assembly 100. To maintain the airtight environment, the apertures 86c and 86d, which provide the passage for electric leads 74 to the control circuit 200 from supply chamber 96, may include sealing grommets 87 (shown in FIG. 4) that plug the apertures 86c and 86d.

The supply valve 100 is in fluid communication with the supply port 28 through the inlet 40 and in fluid communication with the manifold 48 through the supply nozzle 32. Through manifold 48, the supply valve 100 is also in fluid communication with the exhaust nozzle 34, exhaust chamber 98, output recess 43 and output port 30. The supply chamber 96 is configured so that the pressurized fluid supplied through inlet 40 helps force the bender 50 to seal the nozzle 32 when there is no power in the transducer 10. It is preferred that the chamber be dimensioned to achieve at least 25 PSI to have sufficient force to push the bender 50 downwards. In this way, there will be no new fluid supply provided into the manifold 48, while the transducer 10 is permitted to vent through the exhaust nozzle 34.

The exhaust chamber 98 is not airtight and is in fluid communication with at least two venting apertures, 86a and 86b in outer cover 80 (shown in FIG. 4) to bleed excess or unwanted fluid pressure from the transducer 10. The exhaust chamber 98 encases the exhaust nozzle 34, the exhaust valve bender 52 and the cantilever mount 62b to form an exhaust valve assembly 102. The exhaust valve assembly 102 is in fluid communication with the manifold 48 through exhaust nozzle 34, and thereby with output recess 43, output port 30 and the supply valve assembly 100. A sealing gasket 104 configured with apertures 105a, 105b, 105c, and 105d that correspond to the configuration of the cantilever fastener 62a and 62b, nozzles 32 and 34 and the dividing wall 94, may be interposed between the outer cover 80 and the valve body 20 to increase the air tight seal within the transducer 10.

Referring to FIGS. 4 and 6, the outer cover 80 has formed on its front surface 82 a sensor body recess 106 which is configured and arranged to accept an electric pressure sensor 108. The pressure sensor 108 also extends through an aperture 128 formed in the substrate 92 to more securely retain the pressure sensor 108. An 0-ring gasket 110 may be included to create an airtight seal of pressure sensor 108 between the substrate 92 and the outer cover 80. The pressure sensor 108 is operationally connected to the substrate 92 by electrical connectors 112 and provides the control circuit 200 with a constant pressure reading within the transducer 10. A sensor inlet 114 is formed through the outer cover 80 within the recess 106. A passageway 116 (best seen in FIG. 6) that opens to inlet 114 is formed through the dividing wall 94 and valve body 20 to the manifold 48 and provides a passageway from which the pressure sensor 108 can monitor the pressure within the valve body 20. Thus, a complete pneumatic subassembly, comprised of the outer cover 80, the valve body 20, and the backing plate 44 forms a pair of high capacity, two-way, piezoelectric valves that are configured and arranged with the control circuit 200 and pressure sensor 108 to attain and maintain a desired pneumatic pressure within the transducer 10.

When assembled, the entire transducer 10 has a valve body having an approximate outer dimension of 2.5" W ×2.7"L×0.085" H. Fasteners 118 are configured to mate with linearally aligned trough bores 120, which are formed directly through the outer cover 80, the valve body 20, the back plate 44, and gaskets 46 and 104, to sealingly secure the individual components of the transducer 10 in an airtight environment.

Figure 8A:
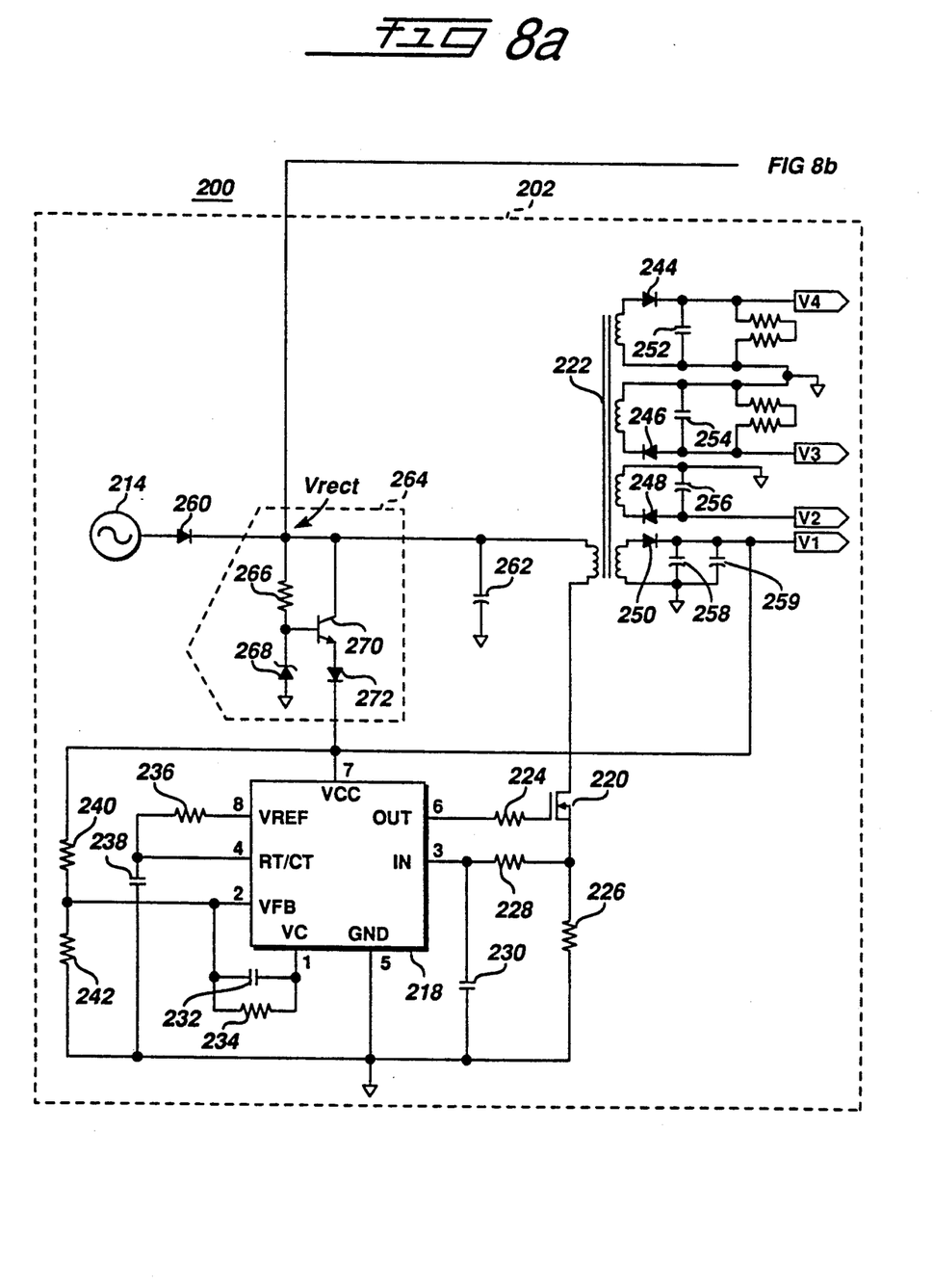
FIGS. 8a and 8b is an electrical schematic depicting the control circuit for the electro-pneumatic transducer in accordance with the invention.
Figure 8B:
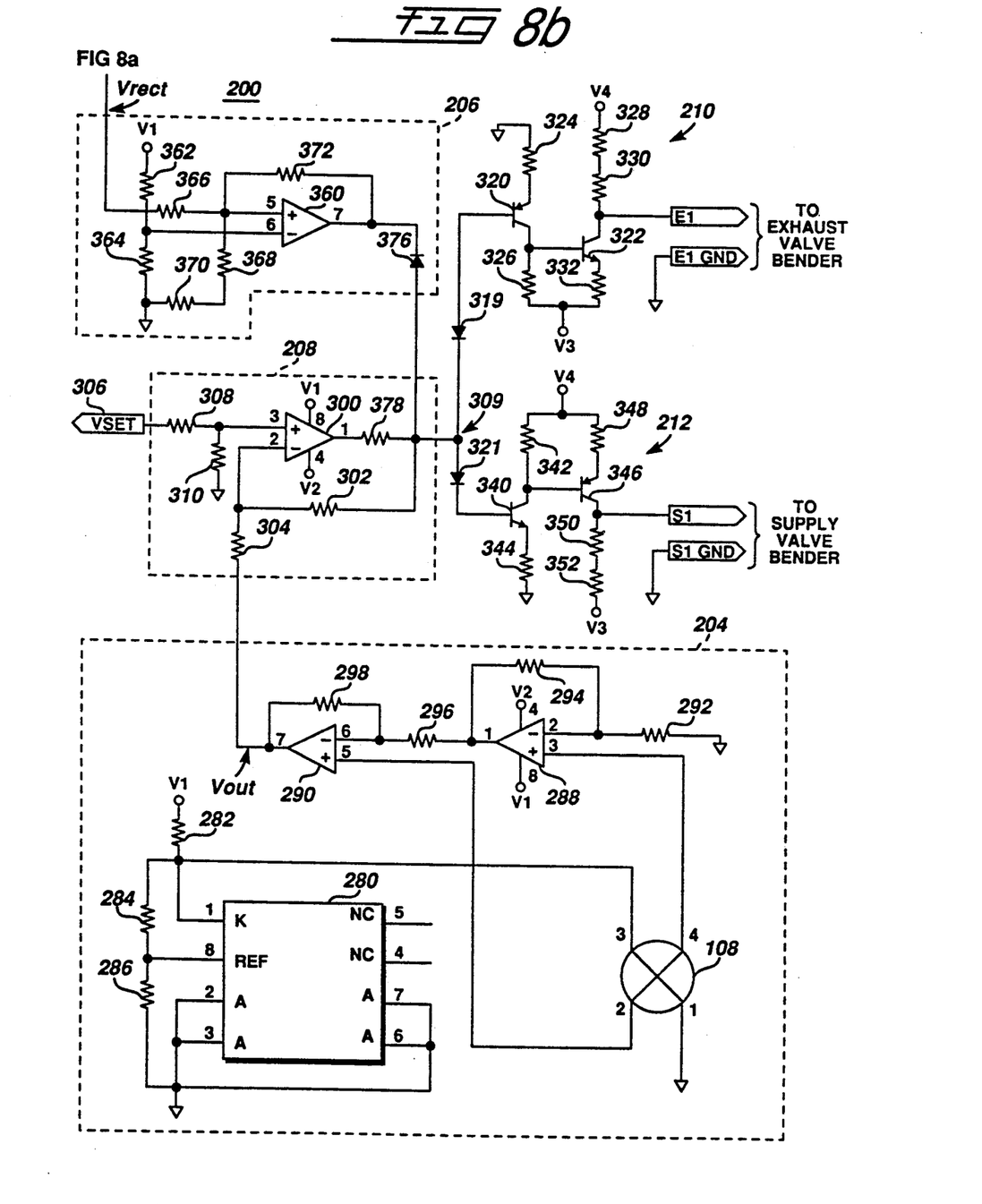

FIGS. 8a and 8b shows the electrical connections for the various components which form the control circuitry 200 which electrically communicates with the benders 50 and 52 through electrical leads 74 to attain and maintain the desired pressure value for the transducer 10. The control circuitry 200 includes switching power supply circuit 202, pressure sensor signal amplification circuit 204, power supply monitoring circuit 206, error signal amplifier circuit 208, exhaust valve drive circuit 210, and supply valve drive circuit 212.

The switching power supply circuit 202 converts an AC input voltage 214 into four DC supply voltages: V1 which is positive 15 VDC, V2 which is negative 15 VDC, V3 which is negative 160 VDC and V4 which is positive 160 VDC. Hence, switching power supply circuit 202 converts an AC input voltage to multiple DC outputs. The multiple DC output voltages V1, V2, V3, and V4, are generated using a fixed frequency, variable duty cycle, current mode controller integrated circuit (hereinafter "IC") 218, a MOSFET switch 220, and a flyback transformer 222.

The current mode controller IC 218 is preferably a UC2845 available from Motorola, Inc. The MOSFET switch 220 is preferably an MTD2N20 also available from Motorola, Inc. The current mode controller IC 218 controls MOSFET switch 220 through a 47 ohm resistor 224 to energize the primary of flyback transformer 222. The drain terminal of MOSFET switch 220 couples to the primary of the flyback transformer 222. A 1 ohm resistor 226, coupled to the source terminal of MOSFET switch 220, provides both a primary current limit and a primary current feedback to current mode controller 218. An RC network formed by a 1.43K ohm resistor 228 and a 0.001 microfarad capacitor 230 filter current pulses resulting from winding capacitance of the transformer 222 in order to prevent false triggering of the current mode controller's 218 internal current limit circuitry. A 22 nanofarad capacitor 232 and a 560K ohm resistor 234 are coupled in parallel to the controller IC and provide frequency compensation for the current mode controller's 218 internal feedback amplifier.

A 22.1K ohm resistor 236 and a 0.001 microfarad capacitor 238, set the current mode controller's 218 internal oscillator frequency at approximately 40 kHz. The controller IC 218 employs a 49.9K ohm resistor 240 and a 10K ohm resistor 242 to monitor output voltage V1 through feedback to the current mode controller 218. Rectifying diodes 244, 246, 248, and 250 in conjunction with corresponding 0.01 microfarad capacitors 252, 254, and 22 microfarad capacitors 256 and 258, rectify and filter, to a DC value, current pulses delivered through secondary windings of the transformer 222. Rectifying diode 260 in conjunction with a 22 microfarad capacitor 262, rectify and filter AC line voltage 214 on the primary of transformer 222. Another 22 microfarad capacitor 259 provides additional filtering.

A half-wave rectified voltage from the rectification and filtering due to diode 260 and capacitor 262, is applied to the power monitor circuit 206, and is also applied to a start up circuit 264. The start up circuit 264 includes a resistor 266 coupled to a zener diode 268, such as an MMBZ5242B. A transistor 270 such as an MMBTA06L, and diode 272 help supply the current mode controller IC 218 with a minimum operating voltage until DC supply voltage V1 exceeds the minimum operating voltage of the start up circuit 264. When DC supply voltage V1 exceeds the output of the start up circuit 264, diode 272 and transistor 270 turn off thereby allowing current mode controller IC 218 to draw power from DC supply voltage V1.

The pressure sensor signal amplification circuit 204 includes a programmable shunt regulator IC 280 which functions as a stable power source for the pressure sensor 108. DC supply voltage V1 serves as the power source to the regulator IC 280 through a 1.5K ohm resistor 282. Resistor 282 limits the total circuit of the regulator IC 280 and the pressure sensor 108 current to approximately 7 mA. Associated regulator resistors include a 7.15K ohm resistor 284 coupled to another 7.15k ohm resistor 286 which help form a feedback network that programs the shunt regulator IC 280 output voltage to 5 VDC. The pressure sensor 108 provides a low level differential output signal which is linearly related to sensed gauge pressure inside the manifold 48. The pressure sensor 108 is preferably an internally temperature compensated and calibrated device such as an MPX2100, manufactured by Motorola, Inc. However, it will be recognized that any suitable pressure sensor may also be employed.

The pressure sensor's differential output signal is applied to the input of a high input impedance amplifier stage formed by amplifiers 288 and 290, such as a pair of op-amps from an AD706AR amplifier IC, manufactured by Analog Devices of Norwood, Mass. The amplification stage has a differential voltage gain of approximately 181 and has essentially a zero common mode voltage gain. Applied gauge pressures ranging from 0–20 psig correspond to an output from the amplifier stage ranging between 0 and 5 VDC respectively. The voltage gain for the amplification stage, as known in the art, is determined by a 56.9k ohm resistor 292, a 316 ohm resistor 294, another 316 ohm resistor 296, and a 56.9k resistor 298.

The output from the amplification stage, $V_{out}$, serves as the input vol through the error input signal amplifier circuit 208 to exhaust valve drive circuit 210, and supply valve drive circuit 212. The error signal amplifier circuit 208 includes an amplifier 300, and accompanying circuitry. The amplifier 300 is an amplifier from an IC, MC33178D manufactured by Motorola, Inc. The error signal amplification circuit 208 serves as a differential error amplifier having a voltage gain of 100 determined by the ratio of a 1 megaohm resistor 302 to a 10.0K ohm resistor 304. An analog set point signal, $V_{set}$, 306 serves as an input to the error signal amplifier circuit 208 through a 10.k ohm resistor 308. A 1.0 megaohm resistor 310 serves to help reduce offset voltage amplifications as known in the art. The set point signal, $V_{set}$, is set according to a desired output pressure from transducer 10.

Error signal amplifier circuit 208 compares $V_{set}$ to $V_{out}$. When $V_{out}$ is lower than $V_{set}$, a positive voltage control signal will appear at the output of the amplifier 300 indicated at point 309. The positive voltage control signal at this point will force the bender 50 away from the nozzle 32 forcing the supply valve 100 into an open condition permitting fluid to enter into the manifold 48 from chamber 96 while the exhaust valve 102 remains driven in a fully closed condition restricting the flow of fluid into the exhaust chamber 98 and out the venting apertures 86a and 86b. Therefore, output pressure through output port 30 will rise until the voltages $V_{out}$ and $V_{set}$ are substantially equal.

In a complementary fashion, when $V_{out}$ is higher than $V_{set}$, a negative voltage control signal will appear at point 309 and force the bender 52 away from the nozzle 34 forcing the exhaust valve 102 into an open condition while the bender 50 is actuated toward the nozzle 32 forcing the supply valve 100 to remain driven in a fully closed condition. Hence fluid will rush into the exhaust chamber 96 and will vent out of the valve body 20 through ventilating apertures 86a and 86b, while no new fluid is allowed to enter from the supply chamber 96. Consequently, output pressure will all until the voltages $V_{out}$ and $V_{set}$ have equalized. When $V_{set}$ and $V_{out}$ are substantially equal, the amplifier error voltage will return to zero allowing both valves to rest in a fully closed condition.

The exhaust valve drive circuit 210 includes a voltage level shifting transistor 320 such as an MMBT6520L and a drive transistor 322, such as an MMBT6517L, which serve to drive the exhaust bender 52 for the exhaust valve 102. The level shifting transistor 320 in conjunction with a 100K ohm resistor 324 and another 100k ohm resistor 326 comprise a unity gain level shifting stage. The output at the collector of transistor 320 serves as the input to the base of the drive transistor 322. The drive transistor 322 in conjunction with a 909K ohm resistor 328, another 909k ohm resistor 330, and a 46K ohm resistor 332, form a voltage gain stage. The ratio of the sum of resistor 328 and 330 to the value of resistor 332 set the voltage gain for this stage at approximately 40. The collector of drive transistor 322 couples to the second bender 52 through the electrical leads 74.

In a similar manner, the supply valve drive circuit 212 includes a level shifting stage and voltage gain stage but are complements of the exhaust valve stages as described previously. Level shifting transistor 340, such as an MMBT6517L, in conjunction with a two 100k ohm resistors 342 and 344 serve as the unity gain level shifter for the supply valve drive circuit 212. Drive transistor 346, such as an MMBT6520L, in conjunction with resistors 348, 350, and 352 serve as the amplification stage of the supply valve drive circuit 212. The amplification stage for the supply valve drive circuit also has a gain of approximately 40. The gain of the amplification stage is determined by the ratio of the resistors 350 and 352 to that of resistor 348. Diode 319 serves to prevent positive voltages from being applied to the exhaust valve drive circuit 210. In a like manner diode 321 serves to prevent negative voltages from being applied to the supply valve drive circuit 212. The collector of transistor 346 couples to the first bender 50. The second bender 52 and the first bender 50 have ground returns E1 GND and S1 GND respectively.

Referring back to the power monitor circuit 206, an amplifier 360 such as one of a plurality found in a MC33178D package is used as a comparator which generates a failure mode signal which causes the exhaust valve and supply valve to operate in a fail-safe mode during power supply failures. A voltage reference is formed using a 909k ohm resistor 362 in series with another 909k ohm 364 resistor wherein the voltage reference serves as an input to the inverting terminal of the amplifier 360. A 100K ohm resistor 366, a 49.4K ohm resistor 368, and a 10k ohm resistor 370, allows the power monitor circuit to monitor the rectified line voltage $V_{rect}$. A 909k ohm positive feedback resistor 372 which is coupled across the positive input terminal of the amplifier 360 and the output terminal of amplifier 360 provides a small amount of feedback to help generate clean switching transitions and improve noise rejection.

Under normal operating conditions, the voltage at the non-inverting terminal of amplifier 360 will exceed the voltage at the inverting terminal. The output of amplifier 360 will remain high and a diode 376 coupled to the output of the amplifier 360 will be in an off state. Following an AC power line failure, $V_{rect}$ will decrease and the output of the amplifier 360 will transition towards the negative DC supply voltage V2 since the voltage at the non-inverting terminal $V_{rect}$ will fall below the reference voltage. Diode 376 then conducts and allows the output of amplifier 360 to override the output from the error signal amplifier 208. A 46.4k ohm resistor 378 limits the current required to achieve an override condition. The override condition momentarily forces the second bender 52 to bend away from the nozzle 34 causing a fully opened valve condition in exhaust valve 102, and forces the first bender 50 to bend toward the nozzle 32 causing a fully closed supply valve condition in supply valve 100 to depressurize the valve body.

A predetermined duration of the override is a function of the hold-up time of the switching power supply 202. The filter capacitor 262 will typically store enough energy to provide approximately 50 ms of hold-up time. Therefore the exhaust valve drive circuit 210 and the supply drive circuit 212 can be activated during the 50 msec predetermined hold up time to effectuate a controlled fail-safe mode.

During normal operation, the present transducer 10 operates in a sealed, closed loop system when the desired pressure value is attained and maintains a continuous control over the electro-pneumatic activity within the transducer 10. There are essentially four states in which the transducer 10 operates to attain and maintain a desired fluid pressure level within the valve body 20, i.e., a quiescent state, a low pressure state, a high pressure state and a power failure or shut-off state. Initially, during powering up, the pressure sensor 108 will provide a zero PSI reading to the control circuit 200, thereby activating the control circuit 200 to drive the benders 50 and 52 into a pressurization state given that the $V_{SET}$ is not zero. The pressurization state is activated by the control circuit 200 during initial power up and also during low pressure states to initially attain and then subsequently maintain a desired fluid pressure level corresponding to the pneumatic actuator being driven by the transducer 10.

Initially, the pneumatic fluid, typically air, enters the valve body 20 through the supply port 28. The assembled views depicted in FIGS. 5 and 6 can be referred to for a more clear understanding of the fluid flow during operation. The fluid travels through supply port 28 and into the supply chamber 96 through the supply inlet 40. The inlet 40 is typically formed adjacent to the supply nozzle 32. Once the fluid has entered the supply chamber 96, if the bender 50 has been activated to bend upwards or stroked upwards, the fluid is allowed to flow through the nozzle 32 and into the manifold 48. As discussed above, the manifold 48 acts as a damping volume to absorb pressure fluctuations or the shock of initial pressurization of the transducer 10. During pressurization of the transducer 10, the bender 50 is driven away from the nozzle 32, thereby permitting fluid to enter the manifold 48. In contrast, the control circuit 200 will cause the bender 52 of the exhaust valve 102 to bend downwardly against the aperture 36 of nozzle 34 to restrict the flow of fluid into the exhaust chamber 98 so that fluid is not allowed to escape through the venting apertures 86a and 86b. Accordingly, when the exhaust valve 102 is closed, the transducer 10 is allowed to pressure up to the desired fluid pressure value. The fluid maintained within the manifold 48 is permitted to flow through the output port 28 and into the pneumatic activator being utilized.

The pneumatic actuator itself acts as a restrictor against the fluid causing the pressure in the manifold 48 to rise. Once the pressure sensor 108 senses that the pressure in the manifold 48 has achieved the desired fluid pressure amount, the pressure sensor 108 electrically communicates this information to the control circuit 200. The control circuit 200 thereafter will electrically communicate through electric lead 74 the appropriate electrical signal which strokes the bender 50 downwards and towards the nozzle 32 to restrict the flow of additional fluid to the manifold 48. Simultaneously, control circuit 200 while also electrically communicating the appropriate signal to the bender 52 to restrict the flow of fluid into the exhaust chamber 98, thereby maintaining the appropriate pressurized fluid level. In short, once the desired fluid pressure has been attained, the transducer operates in a closed-loop state, where both the supply valve 100 and the exhaust valve 102 are forced to restrict the flow of fluid therethrough in order to maintain the desired pressure level.

The transducer 10, when operating in a quiescent state is essentially a closed-loop, substantially airtight system in which electrical consumption, air consumption and valve operation is minimal. However, in operation, situations arise where the pressure within the transducer 10 drops below or rises above the desired fluid pressure level. Typically, such pressure fluctuations may be sufficiently dampened through the manifold 48, thereby bypassing any activation or deactivation of the benders 50 and 52. However, when the pressure sensor 108 does measure a pressure decrease which has not been treated by the manifold 48, the pressure sensor 108 will communicate the pressure decrease to the control circuit 200. The control circuit 200 will in turn cause the supply valve bender 50 to bend away from the aperture 36 of nozzle 32 to allow new fluid from supply chamber 96 to enter the manifold 48. Simultaneously, the control circuit 200 will cause the exhaust valve bender 52 to bend towards the aperture 36 of nozzle 34 in order to restrict any flow of fluid into the exhaust chamber 98, whereby no fluid is allowed to vent out of the valve body 20. By allowing fluid into the valve body 20 while restricting its flow out of body 20, the fluid pressure will rise until the pressure sensor 108 senses that the desired fluid pressure level has been reattained in the manifold 48.

Similarly, during normal operation of the transducer 10, situations will arise when the fluid pressure within the manifold 48 increases to an undesirable level which the manifold 48 cannot effectively dampen. Once the sensor 108 senses a pressure increase in the manifold 48, the appropriate signal is relayed to the control circuit 200 for depressurizing the valve body 20. Depressurization is accomplished by simultaneously restricting the flow of fluid through the supply valve 100 while permitting the flow of fluid through the exhaust valve 102 until the pressure sensor 108 senses the pressure in manifold 48 to be the desired pressure level. Accordingly, although the transducer 10 will typically be operating in a quiescent state, the supply valve 100 and exhaust valve 102 coupled with the configuration of benders 50 and 52 and pressure sensor 108 and control circuit 200, will provide an efficient and responsive closed loop, continuous monitoring electro-pneumatic system which is adaptable for numerous pneumatic actuators.

The unique configuration of the supply valve 100, exhaust valve 102 and manifold 48, combine to create an independent fail-safe condition, which is designed to depressurize the transducer 10 during power failure or shutoff. The independent fail-safe condition complements the monitoring circuit override system, or power monitoring circuit 206. The momentary override caused by the power supply monitoring circuit 206 combined with the mechanical hysteresis of the piezoelectric benders intensifies the effect of the independent fail-safe mode by forcing an unpowered exhaust valve 102 to rest in the lowest restriction condition. This guarantees a rapid fail-safe action of the pneumatically controlled device. Without such an override, the independent fail-safe would still function but the exhaust valve's electrical drive prior to and during power failure would not be determinate. This could result in a rest (no power) condition which does not provide the lowest restriction.

As specified above, the supply valve bender 50 and the exhaust bender 52 are each mounted onto their respective cantilever mounts 62a and 62b within specific tolerances from the nozzles 32 and 34. Furthermore, the supply chamber 96 is configured to maintain a constant chamber pressure since it is always provided fluid through the supply port 28 and inlet 40. During a power failure or shutdown, the pressure within the supply chamber 96 will help force the bender 50 against the nozzle 32 in order to restrict the flow of fluid from the supply valve into the manifold 48. Since there is practically no measurable gap between the second surface 60 of the bender 50, when there is no voltage supplied to the transducer 10, the supply valve bender 50 is naturally resting against the nozzle 32, thereby intrinsically restricting the flow of fluid into the manifold 48. Also, because of the naturally capacitive properties of the preferred piezoelectric material utilized, the supply valve bender 50 will typically remain in a bent down state even during power failure or power shutdown for a sufficient amount of time to allow the pressurized fluid within the valve body 20 to escape through the exhaust valve 102. However, as specified above, the exhaust valve bender 52 is also spaced from the exhaust nozzle 34, such that the exhaust valve bender 52 is intrinsically separate from the nozzle 34 and will naturally permit the flow of fluid into the exhaust chamber 98 for ventilation through venting apertures 86a and 86b.

Thus, the transducer 10 is in essence a closed system, because once the desired pneumatic pressure is attained within the manifold 48, which feeds to the output port 28 and into the pneumatic actuator utilized, no additional nozzle activity takes place, unless there is a decrease or increase in pressure do to some activity occurring through the pneumatic actuator. Otherwise, leakage from the transducer 10 is immeasurable and will not usually create pressure fluctuation.

The electro-pneumatic transducer 10 of the current invention has the advantage of having an independent fail-safe feature coupled with an controlled electronic override system which effectively and efficiently depressurizes the transducer 10 during shutdown or power failure situations, with minimal valve activity. The transducer of the present invention enables the control of the pressurized fluid output from the valve body 20 by using the preferred piezoelectric benders 50 and 52 to control valve pressure within the manifold 48. An additional advantage of the present transducer 10 is that the system operates in a closed loop, almost perfectly airtight environment. Accordingly, because pressure decreases are minimized and consistent repressurization of the valve body 20 is unnecessary, the overall efficiency of the present transducer 10 is increased. Further, control over pneumatic loads is quick, precise and free of any significant hysteresis. Similarly, quiescent state operation is stable for almost any pneumatic load condition which may result. Further, the independent fail-safe condition with reverse flow through the supply nozzle coupled with the power monitor circuit 206 ensures that the valve body 20 is quickly and efficiently depressurized under certain conditions. The inclusion of pressure sensor 108, in conjunction with the unique configuration of the supply valve 100 and exhaust valve 102, creates a transducer 10 which operates at a consistent pressure level throughout operation of the pneumatic actuator.

Moreover, because of the configuration of the present transducer 10, the manufacturing of the component parts and assembly of the transducer 10 is cost effective and uncomplicated. Additionally, because the preferred dimensions of the transducer 10 form a compact, lightweight device, it can be easily adapted for use with existing pneumatic actuators. The transducer 10 of the present invention permits low cost and uncomplicated retrofitting of existent pneumatic systems, which could otherwise entail costly and undesirable redesign of the building structure.

From a manufacturing standpoint, the present transducer 10 is uncomplicated and relatively uncostly to manufacture and assemble, since the individual components are designed with cost effectiveness in mind. Supply valve 100 and exhaust valve 102 are designed to effectively decrease maintenance since valve movements are minimal. Also, since the transducer 10 functions in an airtight environment, fluid and pressure losses are significantly minimized. Moreover, the manifold 48 helps to eliminate vibrations or oscillations within the valve assemblies and to increase effective response time without damage to the pneumatic actuator. Also, the novel inclusion of the discs 76 increases the overall consistency of the transducer 10, while helping to insure the effective restriction of fluid flow quickly and easily.

While a preferred embodiment of the present invention has been shown and described, it should be understood that various alternatives, substitutions, and equivalents can be used, and the present invention should only be limited by the claims and equivalents thereof.

Various features of the present invention are set forth in the following claims.

What is claimed is:

1. An electro-pneumatic pressure transducer comprising:

a valve body assembly having a supply chamber sealingly separated from an exhaust chamber;

intake means in fluid communication with said supply chamber for providing a source of fluid to the transducer;

output means for directing the fluid to a pneumatic actuator;

a first two-way bender and a supply nozzle, said bender being adjustably mounted to said valve body within said supply chamber to selectively permit and restrict the flow of fluid through said supply nozzle and into said manifold means according to signals supplied form said control means;

a second two-way bender and an exhaust nozzle, said second bender being adjustably mounted to said valve body within said exhaust chamber to selectively permit and restrict the flow of fluid form said manifold means into said exhaust chamber;

said first bender and said second bender each having a first end, a second end, an upper surface and a lower surface;

manifold means for fluidly connecting said intake means, said supply chamber, said exhaust chamber, and said output means;

pressure sensor means for measuring the pressure in said valve body, said sensor means being responsive to increases or decreases of the pneumatic pressure in said valve body;

means for monitoring a power source wherein said means for monitoring generates a failure mode signal when said power source fails to supply a predetermined level of power;

means, responsive to said failure mode signal, for controlling said first bender and said second bender to depressurize the transducer; and said supply chamber and said exhaust chamber being configured and arranged with respect to said manifold means so as to provide an intrinsic fail safe action during temporary power failure independent from a fail-safe mode based on said failure mode signal, said intrinsic fail-safe action using said fluid from said intake means to drive said first bender against said supply valve while forcing said second bender away from said exhaust valve to bleed said fluid out said exhaust chamber resulting in substantially zero pressure within said valve body.

2. The transducer as defined in claim 1 wherein said first bender and said second bender are made of a capacitive piezoelectric material.

3. The transducer as defined in claim 1 wherein sealing disks are securely affixed to said lower surface of said first bender and said lower surface of said second bender, said disks being configured and arranged to securely restrict the flow of fluid through said supply nozzle or said exhaust nozzle respectively.

4. An electro-pneumatic pressure transducer comprising:

a valve body assembly having supply means for selectively permitting and restricting the flow of the fluid into said valve body and exhaust means for selectively permitting and restricting the flow of fluid from said valve body for ventilation;

adjustable cantilever mounts for adjustably mounting said supply means and said exhaust means to said valve body;

intake means in fluid communication with said supply means for providing a source of fluid to the transducer;

output means for directing the fluid to a pneumatic actuator;

manifold means for fluidly connecting said supply means, said exhaust means and said outlet means;

said manifold means further providing a damping volume for stabilizing rapid pressure fluctuations within said valve body;

said valve body further including an airtight supply chamber housing said supply means and a separate exhaust chamber housing said exhaust means;

said exhaust chamber having venting means for venting fluid permitting to flow into said exhaust chamber;

pressure sensor means for measuring the pressure in said valve body, said sensor means being responsive to increases or decreases of the pneumatic pressure in said valve body;

control means for electronically controlling said supply means and said exhaust means to attain and maintain a desired fluid pressure; and means for depressurizing said valve body by causing said supply means to restrict the flow of fluid into said valve body while said exhaust means permits the flow of fluid to vent from said valve body when power to said control means is absent for a predetermined period of time.

5. The transducer as defined in claim 4 wherein said supply means comprises a first bender adjustably mounted to said valve body with respect to a supply nozzle and said exhaust means comprises a second bender adjustably mounted to said valve body with respect to an exhaust nozzle, said supply nozzle and said exhaust nozzle being in fluid communication with said manifold means.

6. The transducer as defined in claim 5 wherein said first bender and said second bender each have a first surface, a second surface, a first end and a second end, said first bender and said second bender each having a sealing disk securely adhered to said second surface along said second end, said disks being configured and arranged to sealingly close said supply nozzle or said exhaust nozzle when said first bender or said second bender is positioned to restrict the flow of fluid.

7. The transducer as defined in claim 4 wherein said control means further includes means for monitoring a voltage supply for said control means, said monitoring means providing a failure mode signal to said control means to restrict the flow of fluid through said supply means while permitting the flow of fluid through said exhaust means during power failure or power shut down.

8. An electro-pneumatic pressure transducer, comprising:

a valve body assembly having a supply chamber sealingly separated from an exhaust chamber;

intake means in fluid communication with said supply chamber for providing a source of fluid to the transducer;

output means for directing the fluid to a pneumatic actuator;

a supply valve comprising a first electrostrictive bending element mounted onto said valve body, said first bending element configured and arranged relative to said supply nozzle to selectively permit and restrict the flow of fluid through said nozzle;

an exhaust valve comprising a second electrostrictive bending element mounted onto said valve body, said second bending element configured and arranged relative to said exhaust nozzle to selectively permit and restrict the flow of fluid through said exhaust nozzle;

said valve body further including a supply chamber housing said supply valve, an exhaust chamber housing said exhaust means, and a manifold means for fluidly connecting said supply chamber, said exhaust chamber and said outlet means, said supply chamber being airtight when said supply valve is restricting flow of fluid;

adjustable cantilever mounts comprising an adjustable mounting structure, electrically insulating, self locating retaining clamp and fasteners, said cantilever mounts configured to allow said supply valve and said exhaust valve to be precisely mounted to said valve body within a specified tolerance from said supply nozzle or said exhaust nozzle respectively; and control means for electronically controlling said supply means and said exhaust means to attain and maintain a specified fluid pressure.

9. The transducer as defined in claim 8 wherein said manifold is configured to provide a damping volume which stabilizes sudden fluctuations of fluid pressure within the valve body.

10. The transducer as defined in claim 8 wherein said first bending element rests upon said supply nozzle such that said supply valve is intrinsically restricting the flow of fluid unless said first bending element is activated by said control means to permit the flow of fluid and said second bending element is spaced from said exhaust nozzle such that said exhaust valve intrinsically permits the flow of fluid through said exhaust nozzle unless activated by said control means to restrict the flow of fluid.

11. The transducer as defined in claim 8 further comprising:

pressure sensor means for measuring the pressure in said valve body, said sensor means being responsive to increases or decreases of the pneumatic pressure in said valve body;

means for monitoring a power source wherein the means for monitoring generates a failure mode signal when the power source fails to supply a predetermined level of power; and said control means responsive to said failure mode signal such that the control means depressurizes the transducer upon power failure.

12. The transducer as defined in claim 11 wherein said control means causes said first bending element to close said supply nozzle and said second bending element to close said exhaust nozzle when said control means determines that the desired pressure in the transducer is attained, whereby the transducer operates in a closed loop state.

13. The transducer as defined in claim 11 wherein said control means causes said first bending element to open said supply nozzle and said second bending element to close said exhaust nozzle when said control means determines that there is insufficient pressure in the transducer.

14. The transducer as defined in claim 11 wherein said control means causes said first bending element to close said supply nozzle and said second bending to open said exhaust nozzle when said control means determines that the transducer is over pressurized.

15. An electro-pneumatic pressure transducer comprising:

means for monitoring a power source wherein the means for monitoring generates a failure mode signal when the power source fails to supply a predetermined level of power;

means for comparing said power source to said predetermined level of power;

means, responsive to said failure mode signal, for controlling an exhaust means wherein said means for controlling causes said exhaust means to open in response to said failure mode signal means, responsive to said failure mode signal, for controlling a supply means wherein said means for controlling said supply means causes said supply means to close in response to said failure mode signal; and means for storing an adequate supply of voltage for said means for controlling said exhaust means and said means for controlling said supply means during power failure.

16. The transducer as defined in claim 15 wherein said exhaust means and said supply means comprise separate piezoelectric bending elements interactive with a given nozzle wherein said bending elements open and close their respective nozzles to regulate fluid flow through said nozzle.

17. The transducer as defined in claim 15 wherein said failure mode signal couples to said means for controlling through a unidirectional coupling device such that a standard control signal generated during normal operation for controlling said means for controlling is overridden.

18. An electro-pneumatic pressure transducer comprising:
   means for monitoring a supply voltage wherein said means for monitoring generates a failure mode signal when said supply voltage falls below a predetermined level;
   means for comparing a predetermined pressure level signal to an output signal from a pressure sensor wherein said means for comparing generates a control signal;
   means, responsive to said failure mode signal and said control signal, for controlling piezoelectric exhaust means wherein said means for controlling causes said exhaust means to move in response to said failure mode signal or said control signal; and
   means, responsive to said failure mode signal and said control signal, for controlling piezoelectric supply means wherein said means for controlling supply means causes said supply means to move in response to said failure mode signal or said control signal;
   said means for controlling said exhaust means and said means for controlling said supply means driving said exhaust means and said supply means into a closed operating state when said predetermined voltage level and said predetermined pressure level are obtained;
   means for storing an adequate supply of voltage for said means for controlling said supply means and means for controlling said exhaust means during power failure; and
   override means which generates an override condition that momentarily drives said exhaust means into a full open state and said supply means into a full closed state when said monitoring means senses a power failure, the duration of said override condition being dependent on said storage means.

19. The transducer as defined in claim 1 including an override means which generates an override condition that momentarily drives said exhaust means into a full open state and said supply means into a full closed state when said monitoring means senses a power failure, said override means intensifying the effect of the intrinsic fail safe action.

20. The transducer as defined in claim 5 wherein said supply chamber and said exhaust chamber are configured and arranged with respect to said manifold means so as to provide an intrinsic fail safe action independent from a fail-safe mode based on said failure mode signal, said intrinsic fail safe action using said fluid from said intake means to drive said second bender against said exhaust valve to cause a bleeding of said fluid from said valve body resulting in a substantially zero pressure within said valve body.

21. The transducer as defined in claim 8 wherein said first bending element and said second bending element each having a sealing disk secured thereto, said disk providing a sealing engagement between said first bending element and said second bending element and said supply nozzle and said exhaust nozzle when flow of the fluid is being restricted.

22. The transducer as defined in claim 16 including adjustable cantilever mounts for mounting said bending elements within a valve body with respect to said nozzles, said cantilever mounts configured to allow said bending elements to be precisely mounted to said valve body within a specified tolerance form said nozzles.

* * * * *